3,067,012
METHOD OF PRODUCING SILICON TETRACHLORIDE IN A MOLTEN SALT BATH
Kenneth P. Seltzer, Newton Centre, and Charles B. Wendell, Canton, Mass., assignors to Cabot Corporation, Boston, Mass., a corporation of Delaware
No Drawing. Filed Dec. 15, 1959, Ser. No. 859,567
7 Claims. (Cl. 23—205)

This invention relates to silicon tetrachloride and in particular to a process for the production of silicon tetrachloride from sand in high yields.

It is the principal object of the present invention to provide an improved process for the production of silicon tetrachloride.

It is another object of the present invention to provide a process whereby silicon tetrachloride can be produced in good yields from sand.

It is another object of the present invention to provide a process whereby silicon tetrachloride can be produced by reacting silica sand with carbon monoxide and chlorine in a simple controlled manner involving a minimum of handling problems and amenable to operation on a continuous, sustained basis for relatively long periods of time.

Other objects will in part be obvious and will in part appear hereinafter.

In accordance with the present invention, silicon tetrachloride is produced in good yields by causing silica sand to react with carbon monoxide and chlorine within a molten salt bath fluxing medium maintained at temperatures substantially above about 2200° F. The advantages of the process of the present invention are many; in particular, unlike prior art processes, the present process utilizes relatively inexpensive raw materials, requires little external heat after initiation of the reaction, requires no pelleting or briqueting operation, mitigates the usually formidable problem of containing a reaction involving chlorine at elevated temperatures and permits close control of the reaction and less interruption of operations on a sustained, substantially continuous basis.

In practicing the present invention, the solid silica sand, and the gaseous chlorine and carbon monoxide are introduced into a molten bath comprising an alkali metal halide, or an alkaline earth metal halide or a mixture of any two or more of these. The reaction is initiated for example, by introducing oxygen (or air) and carbon monoxide in excess of the amount necessary for the main reaction involving silica sand, chlorine and carbon monoxide into the molten salt bath. As soon as initiation of the reaction occurs (above about 2200° F.), silicon tetrachloride is produced in high yields and comes off as a gaseous product.

The main reaction, $$SiO_2 + 2Cl_2 + 2CO \rightarrow 2CO_2 + SiCl_4$$

is substantially exothermic and accordingly, once initiated, is self-sustaining. However, if circumstances call for temperatures higher than those self-attainable in the particular apparatus utilized, such higher temperatures are readily attained by preheating one or more of the reactants prior to their introduction into the molten salt bath. For example, either the sand or the gaseous reactants or both can be preheated, but preferably the carbon monoxide and/or chlorine will be supplied in preheated form. Alternatively, the same results can be achieved by introducing into the molten salt bath, small amounts of oxygen (supplied as such or in the form of air) which on reaction therein with some of the carbon monoxide liberates additional heat. When oxygen is introduced into the molten salt bath, an amount of carbon monoxide at least slightly in excess of the amount stoichiometrically necessary for both the main reaction, $$SiO_2 + 2Cl_2 + 2CO \rightarrow SiCl_4 + 2CO_2$$

and for the reaction between carbon monoxide and oxygen, $$2CO + O_2 \rightarrow 2CO_2$$

is continuously introduced into the molten salt bath in order to minimize the amount of unreacted oxygen which will be present in the product stream since free oxygen therein might react to form silicon oxychlorides which would contaminate the silicon tetrachloride product.

The quantity of the gaseous reactants, carbon monoxide and chlorine, utilized in the present invention is not critical. Since, however, the main reaction $$SiO_2 + 2Cl_2 + 2CO \rightarrow SiCl_4 + 2CO_2$$

consumes carbon monoxide and chlorine in stoichiometrically equal amounts, carbon monoxide and chlorine are preferably introduced into the reaction zone for the main reaction in about 1:1 molar ratio, since an excess of either one over the other is largely wasted unless recovered, for example, by recycling. Accordingly, larger and larger excesses of one over the other generally become increasingly economically disadvantageous.

Any alkali metal or alkaline earth metal halide or mixture thereof that has a melting point sufficiently low so as to be molten at the reaction temperatures is suitable for the purposes of the present invention. Also, of course, it is desirable that the molten salts utilized have as low a vapor pressure as possible at the reaction temperatures in order to minimize the carry over of the salt with the product. Accordingly, sodium chloride, calcium chloride, sodium fluoride and mixtures thereof are the preferred constituents of the molten salt bath since these particular salts melt at a sufficiently low temperature but nevertheless exhibit a low vapor pressure at temperatures above about 2200° F.

Any silica sand which comprises at least about 95% $SiO_2$ is suitable for the purposes of the present invention. Of course, if the sand is of even greater purity than 95% and particularly if the sand contains little or no iron, subsequent operations, such as separating ferric chloride from the silicon tetrachloride product, can be minimized or totally eliminated. Accordingly, sands containing at least 99% silicon dioxide are definitely preferred.

The particle size of the silica sand is not critical. In general, the use of smaller particle size sands increases the reaction rate. Accordingly, fine particle size silica sands, that is those having an average particle size of less than that corresponding to −20 +40 mesh are preferred. However, any particle size may be used.

No particular pretreatment of the sand prior to its use is necessary. However, the sand is preferably washed and thoroughly dried prior to use. The washing is desirable in order to remove loose impurities (including organic matter) and drying thereafter is important because the presence of appreciable quantities of moisture in the product stream causes hydrolysis of the silicon tetrachloride product.

In one embodiment of the invention, phosgene is utilized in place of a mixture of carbon monoxide and chlorine. The use of phosgene is advantageous in that the desired reactants (carbon monoxide and chlorine) are present in phosgene as an intimate mixture, and in the preferred equimolar ratio desired for the main reaction. On the other hand, the use of phosgene is disadvantageous in that the reaction between phosgene and sand is less exothermic than the corresponding reaction involving sand, carbon monoxide and chlorine, and in the fact that phosgene, having a relatively low thermal capacity, cannot usually be sufficiently preheated to render the reaction thermally self-sustaining. Accordingly, when phosgene is utilized in place of a mixture of chlorine and carbon monoxide, an external source of heat, such as the introduction into the burner of a mixture of carbon monoxide and oxygen is generally required.

In a preferred embodiment of the present invention, a solid shell of salt is maintained about the inner periphery of the reactor in order to protect the walls of the reactor from the action of the gaseous chlorine. This solid shell of salt is readily established by introducing the gaseous reactants into the molten salt away from the reactor walls and by controlling the temperature in the reactor, so as to allow the layer of salt adjacent the reactor walls to solidify.

There follow a number of non-limiting illustrative examples:

*Example 1*

To a reactor, having a cross-sectional area of one square foot, a depth of three feet and which is lined with silica brick, there is introduced 150 lbs. of a sodium chloride-sand mixture comprising by weight 9 parts NaCl and 1 part $SiO_2$, the $SiO_2$ having an average particle size of —20 +40 mesh. The sodium chloride is melted (melting point of NaCl is 1474° F.) by burning a 2:5 volumetric mixture of CO and air in a pipe burner inserted through a port into the reactor. When the temperature of the melt has reached approximately 2200° F., chlorine and carbon monoxide gases are bubbled through the molten salt bath, each at a rate of about 10 s.c.f.h., causing the gases to react with the sand as illustrated by the following equation $$SiO_2 + 2Cl_2 + 2CO \rightarrow SiCl_4 + 2CO_2 + heat$$

thereby producing about 3.0 s.c.f.h. silicon tetrachloride.

The CO and air flows used for heating are gradually decreased as heat is evolved from the chlorination reaction so that the reactor temperature is maintained at about 2400° F.

The gaseous products of the reaction together with unreacted feed gases are exhausted overhead from the reactor. The silicon tetrachloride is separated from the other gases by condensation, and collected as a liquid in a receiver vessel. Unreacted CO and $Cl_2$ are separated from the other gases, and recycled to the reactor.

Fresh sand is fed to the reactor periodically to replace the sand utilized in the reaction.

*Example 2*

To a reactor having a cross-sectional area of one square foot, a depth of three feet and which is lined with graphite, there is introduced 175 lbs. of a sodium fluoride-sand mixture comprising 7 parts NaF and 3 parts of $SiO_2$, the $SiO_2$ having an average particle size of —40 +65 mesh. The sodium fluoride is melted (melting point of NaF is 1832° F.) by burning a 2:5 volumetric mixture of CO and air in a pipe burner inserted through a port into the reactor. When the temperature of the melt has risen to about 2200° F., chlorine and carbon monoxide gases are bubbled through the molten salt bath, each at a rate of 15 s.c.f.h. causing the gases to react with the sand as illustrated by the following equation:

$$SiO_2 + 2Cl_2 + 2CO \rightarrow SiCl_4 + 2CO_2 + heat$$

thereby producing about 6.8 s.c.f.h. silicon tetrachloride.

The CO and air gas flows used for heating are gradually decreased as heat is evolved from the chlorination reaction so that the reactor temperature is maintained at about 2600° F.

The gaseous products of the reaction together with unreacted feed gases, are exhausted overhead from the reactor. The silicon tetrachloride is separated from the other gases by condensation, and collected as a liquid in a receiver vessel.

Fresh sand is fed to the reactor continuously to replace the sand utilized by the reaction. Fresh NaF is added to the reaction chamber periodically to maintain a constant molten salt bath depth (as indicated by a constant pressure drop across the reactor for the CO and $Cl_2$ gases).

*Example 3*

To a reactor having a cross-sectional area of one square foot, a depth of one foot and which is lined with graphite, there is introduced 75 lbs. of a calcium chloride-sand mixture comprising 8 parts $CaCl_2$ and 2 parts $SiO_2$, the $SiO_2$ having an average particle size of —65 +100 mesh. The calcium chloride is melted (melting point of $CaCl_2$ is 1422° F.) by burning a 2:1 volumetric mixture of CO and $O_2$ in a pipe burner inserted through a port into the reactor.

When the temperature of the reactor has reached about 2200° F., gaseous chlorine and carbon monoxide are bubbled through the molten salt bath, each at a rate of 8 s.c.f.h., causing the gases to react with the sand thereby producing about 2.5 s.c.f.h. silicon tetrachloride.

The CO and $O_2$ gas flows used for heating are gradually decreased as heat is evolved from the chlorination reaction so that the reactor temperature is maintained at about 2450° F.

The gaseous products of the reaction together with unreacted feed gases are exhausted overhead from the reactor. The silicon tetrachloride is separated from the other gases by condensation, and collected as a liquid in a receiver vessel.

*Example 4*

To a reactor having a cross-sectional area of one square foot, a depth of three feet and which is lined with silica brick, there is introduced 190 lbs. of a sodium chloride-sodium fluoride-calcium chloride-sand mixture comprising 3 parts each NaCl, NaF and $CaCl_2$ and 1 part $SiO_2$, the $SiO_2$ having an average particle size of —100 +200 mesh. The salt mixture is then melted by burning a 2:5 volumetric mixture of CO and air in a pipe burner inserted through a port into the reactor. Phosgene gas is then bubbled through the molten salt bath at a rate of 11 s.c.f.h, causing the phosgene to decompose as indicated by the following equation:

$$10COCl_2 + heat \rightarrow 10CO + 10Cl_2$$

The CO and $Cl_2$ thus released react with the sand as follows:

$$SiO_2 + 2CO + 2Cl_2 \rightarrow SiCl_4 + 2CO_2 + heat$$

thereby producing about 4.2 s.c.f.h. silicon tetrachloride.

The CO and air gas flows used for heating are gradually decreased as heat is evolved from the chlorination reaction so that the reactor temperature is maintained at about 2475° F.

The gaseous products of the reaction, together with unreacted feed gases are exhausted overhead from the reactor. The silicon tetrachloride is separated from the other gases by condensation, and is collected as a liquid in a receiver vessel.

Obviously many changes can be made in the above description and examples without departing from the scope of the present invention. Accordingly, it is intended that the above disclosure be regarded as illustrative and as in no way limiting the scope of the invention.

What we claim is:

1. A process for producing silicon tetrachloride at high yields which comprises reacting in a molten bath comprising at least one salt chosen from the group consisting of the alkali metal halides and the alkaline earth metal halides, silica sand, and a reactant chosen from the group consisting of a gaseous mixture containing carbon monoxide and chlorine, and phosgene, at temperatures between about 2200° F. and about 2800° F.

2. The process of claim 1 wherein said molten bath comprises sodium chloride.

3. The process of claim 1 wherein said molten bath comprises sodium fluoride.

4. The process of claim 1 wherein said molten bath comprises calcium chloride.

5. The process of claim 1 wherein said reactant comprises a mixture of carbon monoxide and chlorine.

6. The process of claim 5 wherein oxygen is introduced into the reaction zone.

7. The process of claim 6 wherein said gaseous carbon monoxide is present in amounts at least slightly in excess of the combined amounts necessary (a) to establish a 1:1 molar ratio of chlorine to carbon monoxide and (b) to stoichiometrically react with all said oxygen introduced into the reaction zone.

References Cited in the file of this patent

UNITED STATES PATENTS

| 2,253,471 | Muskat et al. | Aug. 19, 1941 |
| 2,952,513 | Wigton | Sept. 13, 1960 |

OTHER REFERENCES

Mellor: "A Comprehensive Treatise on Inorganic and Theoretical Chemistry," Longmans, Green and Co., N.Y., vol. 6, 1925, pages 960 and 961.

Ser. No. 292,742, Beck et al. (A.P.C.), publ. July 13, 1943.